United States Patent
Noh et al.

(10) Patent No.: US 9,531,201 B2
(45) Date of Patent: Dec. 27, 2016

(54) MOBILE TERMINAL AND CONTROLLING METHOD THEREOF

(71) Applicant: LG Electronics Inc., Seoul (KR)

(72) Inventors: Kensin Noh, Seoul (KR); Euntaek Jeoung, Seoul (KR); Jeunguk Ha, Seoul (KR); Buyoung Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 127 days.

(21) Appl. No.: 14/321,459

(22) Filed: Jul. 1, 2014

(65) Prior Publication Data

US 2015/0048803 A1 Feb. 19, 2015

(30) Foreign Application Priority Data

Aug. 13, 2013 (KR) .................. 10-2013-0095983

(51) Int. Cl.
*H02J 7/04* (2006.01)
*H02J 7/00* (2006.01)
*H04M 1/725* (2006.01)

(52) U.S. Cl.
CPC ............ *H02J 7/0004* (2013.01); *H02J 7/041* (2013.01); *H04M 1/72566* (2013.01); *H04M 1/72572* (2013.01)

(58) Field of Classification Search
CPC ...................................................... H02J 7/007
USPC ....................................................... 320/155
See application file for complete search history.

(56) References Cited

U.S. PATENT DOCUMENTS

| | | | | |
|---|---|---|---|---|
| 5,677,944 A * | 10/1997 | Yamamoto | ............. | H04M 1/73 340/635 |
| 6,194,873 B1 * | 2/2001 | Matsushita | ............. | G05F 1/575 320/137 |
| 7,576,545 B2 * | 8/2009 | Singh | ................ | G01R 31/3634 320/132 |
| 8,395,390 B2 * | 3/2013 | Robinson | ........... | G01R 31/3631 320/132 |
| 8,773,076 B2 * | 7/2014 | Choi | ........................ | H02J 3/32 320/139 |
| 9,093,844 B2 * | 7/2015 | Yonezawa | ................. | H02J 7/00 |
| 9,197,092 B2 * | 11/2015 | Verdun | ................... | H02J 7/082 |
| 2004/0066171 A1 | 4/2004 | Mori | | |
| 2007/0128899 A1 * | 6/2007 | Mayer | .................. | G06F 9/4406 439/152 |
| 2011/0202221 A1 | 8/2011 | Sobue et al. | | |
| 2011/0285345 A1 * | 11/2011 | Kawai | ................ | B60L 11/1825 320/107 |

(Continued)

FOREIGN PATENT DOCUMENTS

| CN | 103222147 A | 7/2013 |
|---|---|---|
| EP | 2466719 A1 | 6/2012 |

(Continued)

*Primary Examiner* — M'Baye Diao
(74) *Attorney, Agent, or Firm* — Birch, Stewart, Kolasch & Birch, LLP

(57) ABSTRACT

A mobile terminal including a battery; a wireless communication unit configured to provide wireless communication; a memory configured to store at least one user battery charging pattern previously used for charging the battery; and a controller configured to start a charging of the battery, estimate a battery charging stop time based on the stored user battery charging pattern, and control the charging speed of the battery to complete charging of the battery before the estimated battery charging stop time.

19 Claims, 19 Drawing Sheets

(56) References Cited

U.S. PATENT DOCUMENTS

| | | |
|---|---|---|
| 2013/0030593 A1 | 1/2013 | Gao et al. |
| 2013/0096751 A1 | 4/2013 | Riley et al. |
| 2013/0314054 A1 | 11/2013 | Bergqvist et al. |
| 2015/0236541 A1* | 8/2015 | Takano ................ H02J 7/0052 320/107 |

FOREIGN PATENT DOCUMENTS

| | | |
|---|---|---|
| EP | 2595269 A1 | 5/2013 |
| WO | WO 2012/069690 A1 | 5/2012 |

* cited by examiner

MOBILE TERMINAL AND CONTROLLING METHOD THEREOF

Pursuant to 35 U.S.C. §119(a), this application claims the benefit of earlier filing date and right of priority to Korean Application No. 10-2013-0095983, filed on Aug. 13, 2013, the contents of which are hereby incorporated by reference herein in their entirety.

BACKGROUND OF THE INVENTION

Field of the Invention

The present invention relates to a mobile terminal, and more particularly, to a mobile terminal and a method of controlling the mobile terminal.

Discussion of the Related Art

A mobile terminal can perform various functions such as data and voice communications, capturing images and video via a camera, recording audio, playing music files and outputting music via a speaker system, and displaying images and video on a display. Generally, terminals can be classified into mobile terminals and stationary terminals. The mobile terminals can be further classified into handheld terminals and vehicle mount terminals.

In addition, the diversification of functions of a mobile terminal requires a high capacity battery and a user needs to charge the battery of the mobile terminal periodically. Currently, a battery of a mobile terminal is charged with a power supplied by an external charging device by CCCV (constant current constant voltage).

According to the CCCV, when a remaining level of a battery is very low, a charging operation is performed using a constant current. If the remaining level of the battery reaches a prescribed level (e.g., about 60%~70%), the charging operation is performed using a constant voltage. Hence, the CCCV prevents an over-current charging and an over-voltage charging on charging a battery. However, the mobile terminal battery charging systems are mostly fixed to the CCCV.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof. For example, once a battery charging starts, an estimated charging stop time on which the battery charging will be stopped by a user in consideration of a user's living pattern is obtained. Subsequently, a charging speed of a battery can be adjusted in order to complete the battery charging before a current time becomes the obtained estimated charging stop time.

To achieve these objects and other advantages and in accordance with the purpose of the invention, as embodied and broadly described herein, a mobile terminal according to an embodiment of the present invention includes a battery, a memory storing at least one condition for controlling a charging speed of the battery in charging the battery, and a controller, if a charging of the battery starts, estimating a charging stop time at which the battery will stop being charged by a user based on the condition, the controller controlling the charging speed of the battery to complete the charging of the battery before a charging start time of the battery reaches the estimated charging stop time.

In another aspect of the present invention, as embodied and broadly described herein, a method of controlling a mobile terminal according to an embodiment of the present invention includes starting a charging of a battery of the mobile terminal, estimating a charging stop time at which the battery will stop being charged by a user based on at least one condition preset for controlling a charging speed of the battery, and controlling the charging speed of the battery to complete the charging of the battery before a charging start time of the battery reaches the estimated charging stop time.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the description only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipment, smart phones, digital broadcast receivers, personal digital assistants, laptop computers, portable multimedia players (PMP), navigators and the like. However, it is apparent to those skilled in the art that a configuration according to an embodiment disclosed in this specification is applicable to such a fixed terminal as a digital TV, a desktop computer and the like as well as a mobile terminal.

Figure 1:
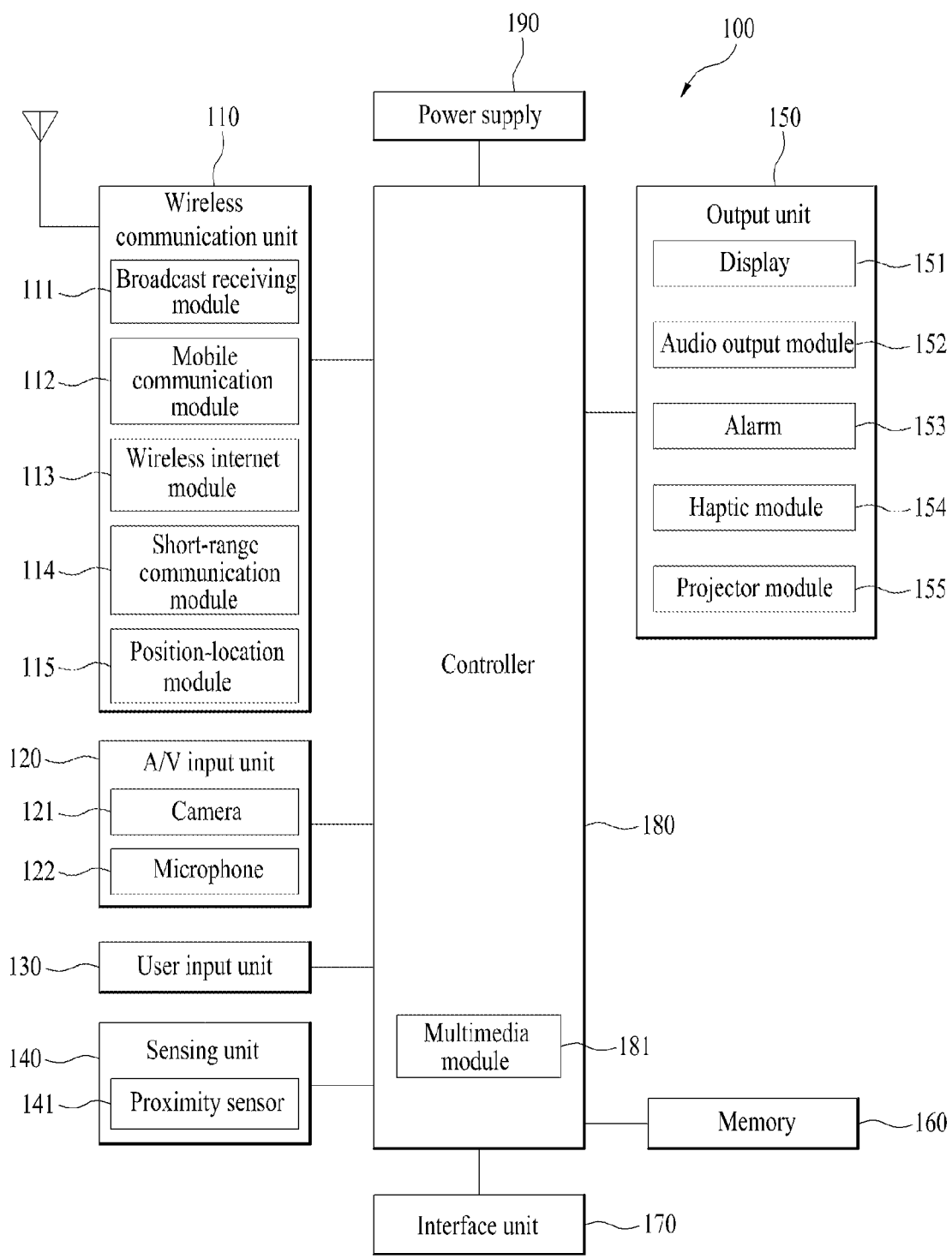
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. In a non-limiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO) and integrated services digital broadcast-terrestrial (ISDB-T). Optionally, the broadcast receiving module 111 can be configured suitable for other broadcasting systems as well as the above-explained digital broadcasting systems. The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-information module 115 identifies or otherwise obtains the location of the mobile terminal 100. If desired, this module may be implemented with a global positioning system (GPS) module. According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 can calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 for a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button provided to front/rear/lateral side of the mobile terminal 100 and a touch sensor (constant pressure/electrostatic) and may further include a key pad, a dome switch, a jog wheel, a jog switch and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

When the display 151 and the touch sensor configures a mutual layer structure (hereinafter called 'touch screen'), the display 151 can be used as an input device as well as an output device. In this instance, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, the touch sensor can be configured to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

Figure 2:
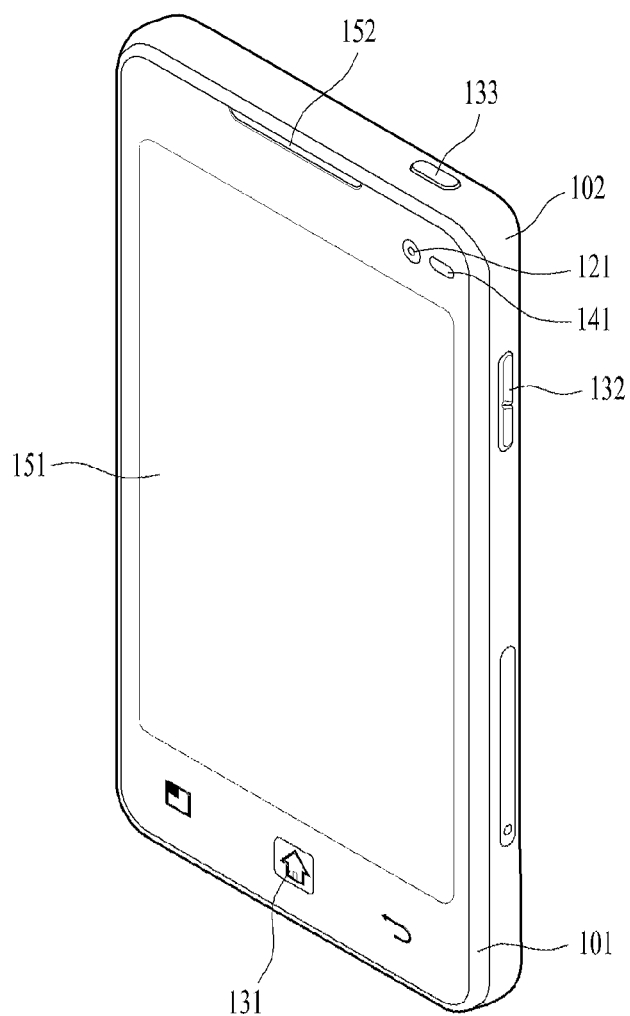
FIG. 2 is a front perspective diagram of a mobile terminal according to one embodiment of the present invention.

Referring to FIG. 2, the proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor 141 has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm 153 is output a signal for announcing the occurrence of a particular event associated with the mobile terminal 100. Typical events include a call received event, a message received event and a touch input received event. The alarm 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

A projector module 155 can also be included for projecting images stored in the memory 160, externally received etc. The projector module 155 can also be rotated so as to project images in different directions.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output for a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 can perform a pattern (or image) recognizing process for recognizing a writing input and a picture drawing input performed on the touchscreen as characters or images, respectively.

The power supply 190 provides power required by the various components for the mobile terminal 100. The power may be internal power, external power, or combinations thereof. A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Next, FIG. 2 is a front perspective diagram of a mobile terminal according to one embodiment of the present invention. The mobile terminal 100 shown in the drawing has a bar type terminal body, however, the mobile terminal 100 may be implemented in a variety of different configurations. Examples of such configurations include folder-type, slide-type, rotational-type, swing-type and combinations thereof. For clarity, the following description will primarily relate to a bar-type mobile terminal 100. However such teachings apply equally to other types of mobile terminals.

Referring to FIG. 2, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Electronic components can be mounted on a surface of the rear case 102. The electronic part mounted on the surface of the rear case 102 may include such a detachable part as a battery, a USIM card, a memory card and the like. Thus, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening configured to expose a camera 121' or an audio output unit 152' externally. The cases 101, 102 and 103 are formed by injection molding of synthetic resin or can be formed of metal substance such as stainless steel (STS), titanium (Ti) or the like for example.

A display 151, an audio output unit 152, a camera 121, user input units 130 (131, 132 and 133), a microphone 122, an interface 180 and the like can be provided to the case 101 or 102. The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131, 132 and 133. The manipulating units 131, 132 and 133 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152 and the like can be input to the second manipulating unit 132, a command for a switching to a touch recognizing mode of the display 151 and the like can be input to the manipulating unit 133.

Figure 3:
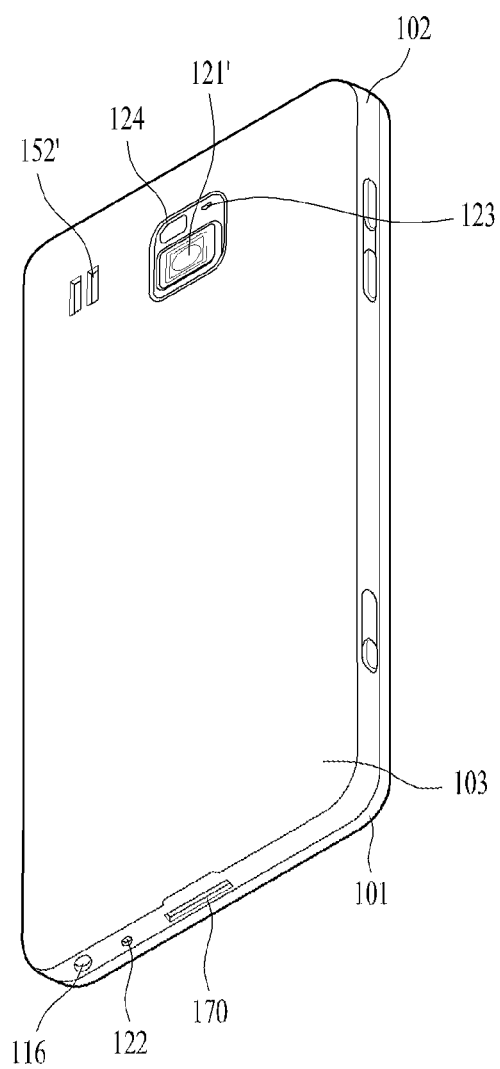
FIG. 3 is a rear perspective diagram of a mobile terminal according to one embodiment of the present invention.

FIG. 3 is a perspective diagram of a backside of the terminal shown in FIG. 3. Referring to FIG. 3, a camera 121' can be additionally provided to a backside of the terminal body, and more particularly, to the rear case 102. The camera 121' has a photographing direction that is substantially opposite to that of the camera 121 shown in FIG. 2 and may have pixels differing from those of the camera 121.

Preferably, for instance, the camera 121 has low pixels enough to capture and transmit a picture of user's face for a video call, while the camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the mirror 124 enables the user to view their face reflected by the mirror 124.

An additional audio output unit 152' can be provided to the backside of the terminal body. The additional audio output unit 152' can implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Meanwhile, according to an embodiment of the present invention, a user's touch action means a touch gesture implemented by performing a contact touch or a proximity touch on the display unit 151 of the touchscreen type. In addition, a touch input means an input received in response to the touch gesture.

The touch gesture may be categorized into one of a tapping, a touch & drag, a flicking, a press, a multi-touch, a pinch-in, a pinch out and the like in accordance with an action. In particular, the tapping includes an action of lightly pressing and depressing the display unit 151 once and means a touch gesture such as a lock of a mouse of a normal personal computer.

The touch & drag is an action of touching the display unit, then moving the touch to a specific point by maintaining the touch to the display unit 151, and then releasing the touch from the display unit 151. When an object is dragged, the corresponding object can be displayed by moving continuously in a drag direction.

The flicking means an action of touching the display unit 151 and then performing a stroke in a specific direction (e.g., top direction, bottom direction, right direction, left direction, diagonal direction, etc.) at a specific speed (or strength). If a touch input of flicking is received, the mobile terminal 100 processes a specific operation based on a flicking direction, a flicking speed and the like.

The press means an action of touching the display unit 151 and then continuing the touch for preset duration at least. The multi-touch means an action of simultaneously touching a plurality of points on the display unit 151. The pinch-in means an action of dragging a plurality of pointers currently multi-touching the display unit 151 in an approaching direction. In particular, the pinch-in means a drag performed by starting with at least one of a plurality of points multi-touched on the display unit 151 and then progressing in a direction having a plurality of the multi-touched points get closer to each other.

The pinch-out means an action of dragging a plurality of pointers currently multi-touching the display unit 151 in a moving-away direction. In particular, the pinch-out means a drag performed by starting with at least one of a plurality of points multi-touched on the display unit 151 and then progressing in a direction having a plurality of the multi-touched points move away from each other.

A process for controlling a charging speed of a battery according to an embodiment of the present invention is described with reference to FIGS. 4 to 19 as follows. First of all, once a battery charging starts, an estimated charging stop time on which the battery charging will be stopped by a user in consideration of a user's living pattern is obtained. Secondly, a charging speed of a battery is controlled in order to complete the battery charging before a current time becomes the obtained estimated charging stop time.

Figure 4:
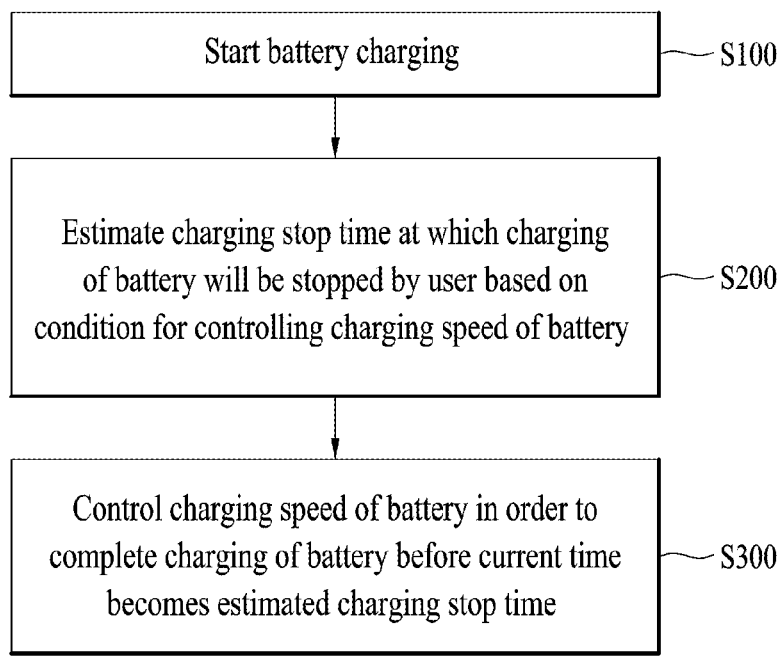
FIG. 4 is a flowchart illustrating a method of controlling a battery charging speed of a mobile terminal according to one embodiment of the present invention.

In particular, FIG. 4 is a flowchart illustrating a method of controlling a battery charging speed of a mobile terminal according to one embodiment of the present invention.

Referring to FIG. 4, a battery built or loaded in the mobile terminal is connected to an external charging device through the interface unit 170.

If the battery starts to be charged (S100), the controller 180 of the mobile terminal 100 obtains an estimated charging stop time, on which the battery charging will be stopped by a user, based on a condition for controlling a charging speed of the battery (S200). In this instance, the condition is set in the memory 160.

After the battery charging has started by connecting the mobile terminal 100 including the battery to the external charging device, the estimated charging stop time means a previously estimated time on which the battery charging will be stopped in a manner that a user separates the external charging device from the mobile terminal 100 irrespective of completion of the battery charging.

Subsequently, the controller 180 controls the charging speed of the battery in order to complete the battery charging before a current time (a battery charging start time) after the start of the battery charging reaches the obtained estimated charging stop time (S300). For instance, as the mobile terminal 100 is connected to the external charging device, if a charging completed time of the battery is estimated to amount to 3 hours from a charging start time of the battery, the 3 hours can be called an estimated charging completed time of the battery.

In addition, the controller 180 can calculate the estimated charging completed time of the battery using a remaining level of the battery, a capacity of the battery, and a power supplied by the external charging device. While the battery is being charged, if a user is going to stop the battery charging after 2 hours from the charging start time of the battery, the 2 hours may be called an estimated charging stop time of the battery. In this instance, in order to complete the charging of the battery to be completed before 2 hours elapses from the charging start time of the battery, the controller 180 controls the charging speed of the battery.

In the following description, a process for setting the condition for a charging speed control of the battery, which is a detailed operation of the step S200, is explained in detail with reference to FIGS. 5 to 12. In particular, FIG. 5 is a flowchart of a process for setting a condition for a battery charging speed control shown in FIG. 4 according to a first embodiment of the present invention.

Figure 5:
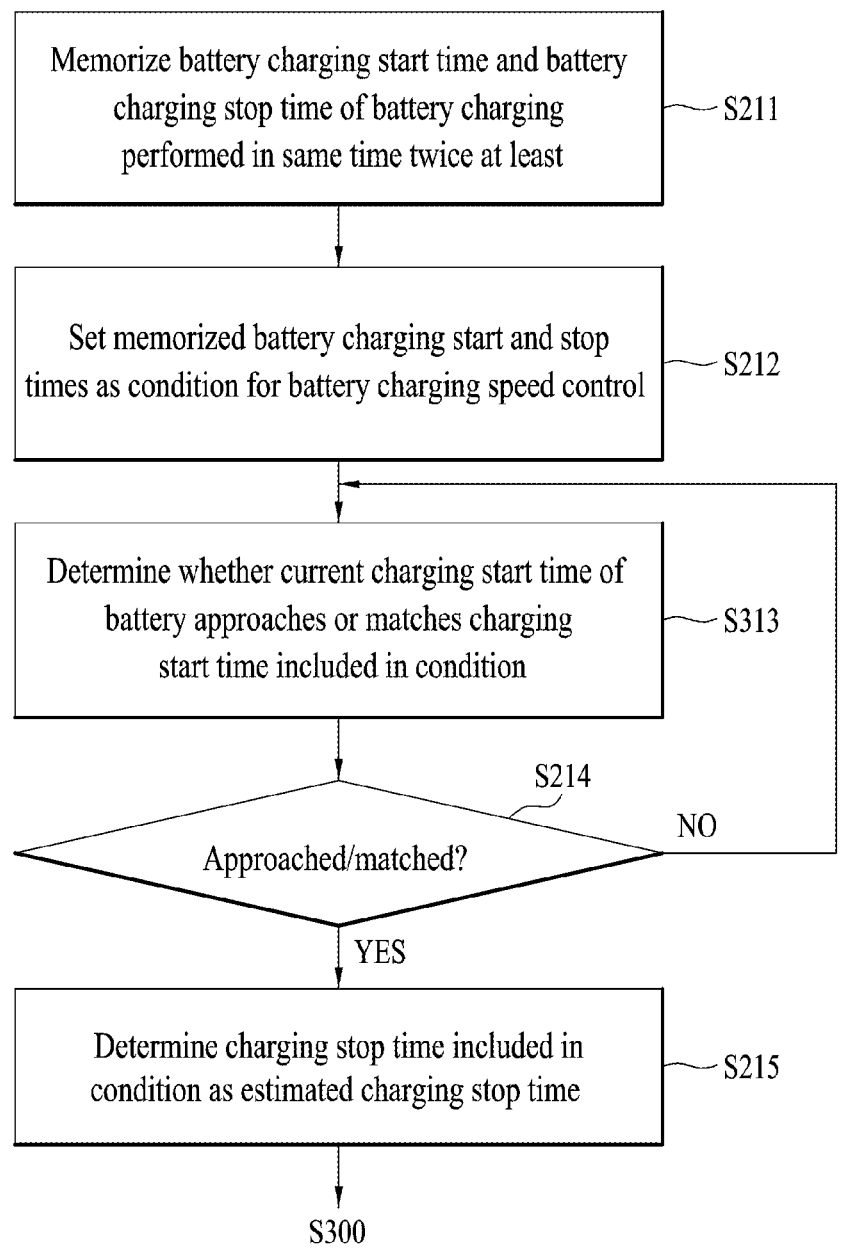
FIG. 5 is a flowchart of a process for setting a condition for a battery charging speed control shown in FIG. 4 according to a first embodiment of the present invention.

Referring to FIG. 5, if a user frequently starts and stops a charging of a battery in a specific time slot, a charging start time and a charging stop time in the specific time slot are set as the condition for the speed control of the battery. In particular, the controller 180 memorizes the battery charging start and stop times performed in the same time twice at least by saving them in the memory 160 (S211). In addition, the controller 180 sets the memorized battery charging start and stop times as the condition for the battery charging speed control (S212).

For instance, if a user starts the charging at 9:00 AM by attending user's office on Monday to Friday and stops the charging at 5:00 PM, the charging start time '9:00 AM' and the charging stop time '5:00' PM are set as the condition. After the condition has been set by the step S211 and the step S212, if the battery charging starts, the controller 180 determines whether a charging start time of the battery approaches or matches the charging start time included in the condition (S213).

As a result of the determination, if the charging start time of the battery approaches or matches the charging start time included in the condition (S214), the controller 180 determines the charging stop time included in the condition as the estimated charging stop time mentioned in the step S200 shown in FIG. 4 (S215).

For instance, if a current charging start time of the battery approaches or matches 9:00 AM set in the condition (e.g., the charging start time of the battery is before or after 9:00 AM by preset minute unit), the controller 180 determines the estimated charging stop time as the 5:00 PM set in the condition and then controls a charging speed of the battery in order to complete the charging of the battery before a current time becomes the determined 5:00 PM.

Figure 6:
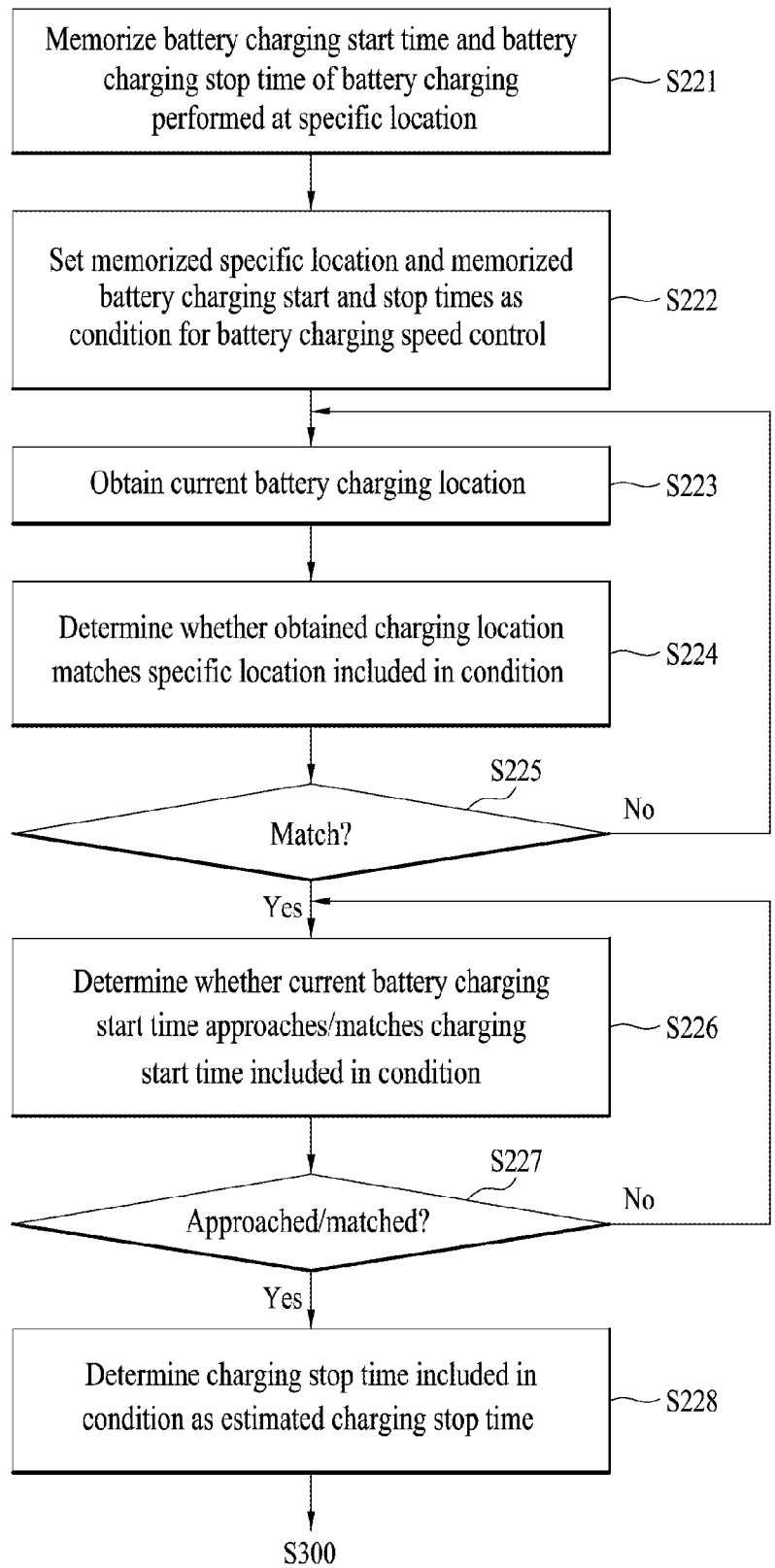
FIG. 6 is a flowchart of a process for setting a condition for a battery charging speed control shown in FIG. 4 according to a second embodiment of the present invention.

FIG. 6 is a flowchart of a process for setting a condition for a battery charging speed control shown in FIG. 4 according to a second embodiment of the present invention. Referring to FIG. 6, if a user frequently starts and stops a charging of a battery at a specific location, the specific location, a charging start time and a charging stop time are set as the condition for the charging speed control of the battery.

In particular, the controller 180 memorizes the battery charging start and stop times performed at a specific location set by a user or a specific location visited by a user twice at least by saving them in the memory 160 (S221). In addition, the controller 180 sets a location information of the memorized specific location and the memorized battery charging start and stop times as the condition for the battery charging speed control (S222).

Thus, the location information of the specific location may be obtained through the position location module 115 or set by the user. For instance, if a user starts the charging at 9:00 AM at user's office and stops the charging at 5:00 PM, a location information of the office, the charging start time '9:00 AM' and the charging stop time '5:00' PM are set as the condition.

After the condition has been set by the step S221 and the step S222, if the battery charging starts, the controller 180 obtains a charging location of the battery (S223) and then determines whether the obtained charging location corresponds to the location information of the specific location included in the condition (S224). As a result of the determination (S224), if the charging location corresponds to the location information of the specific location included in the condition (S225), the controller 180 determines whether a current charging start time of the battery approaches or matches the charging start time included in the condition (S226).

As a result of the determination (S226), if the charging start time of the battery approaches or matches the charging start time included in the condition (S227), the controller 180 determines the charging stop time included in the condition as the estimated charging stop time mentioned in the step S200 shown in FIG. 4 (S228).

For instance, if a current charging start time of the battery approaches or matches 9:00 AM set in the condition (e.g., the charging start time of the battery is before or after 9:00 AM by preset minute unit), the controller 180 determines the estimated charging stop time as the 5:00 PM set in the condition and then controls a charging speed of the battery in order to complete the charging of the battery before a current time becomes the determined 5:00 PM.

Figure 7:
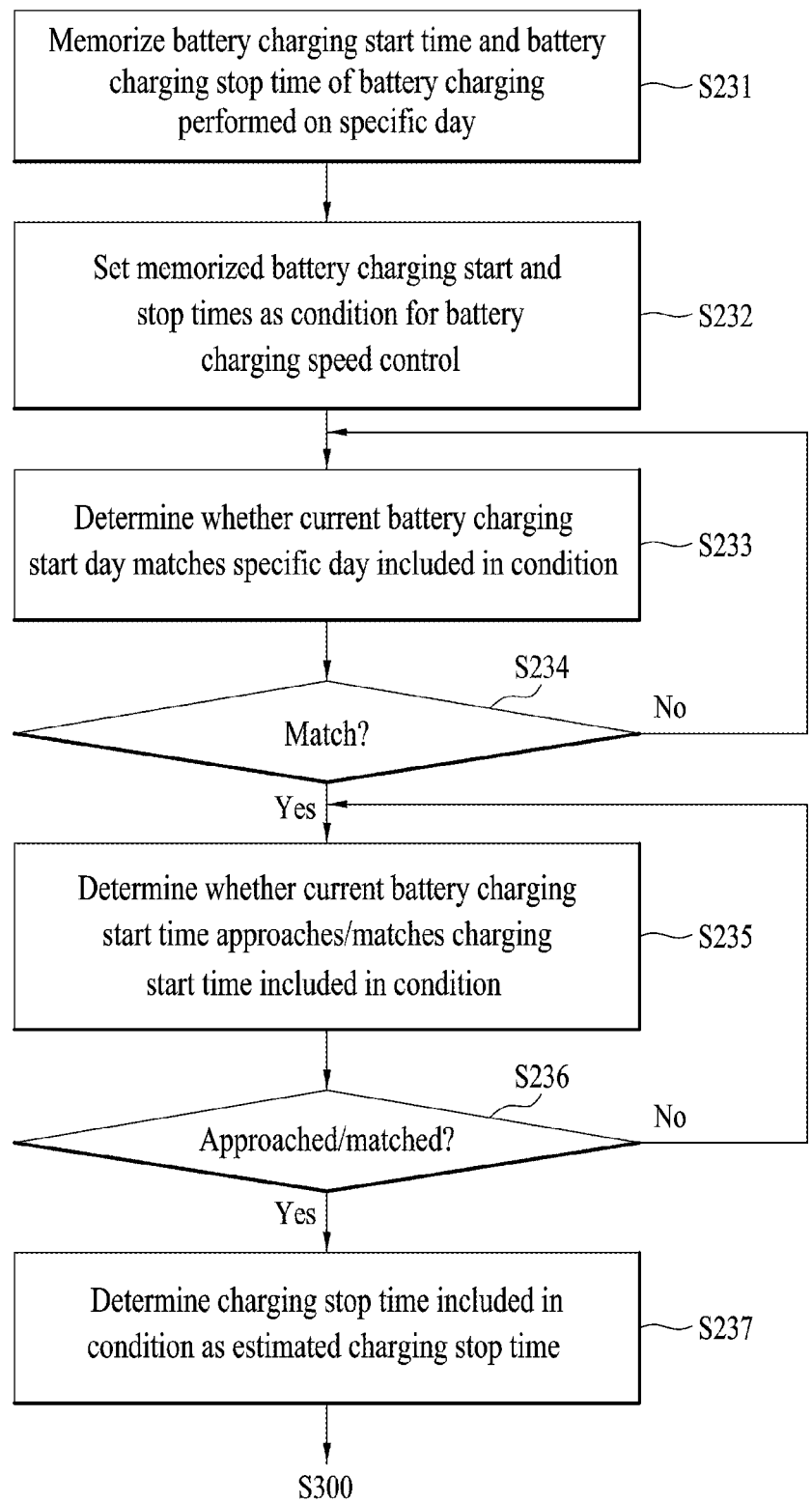
FIG. 7 is a flowchart of a process for setting a condition for a battery charging speed control shown in FIG. 4 according to a third embodiment of the present invention.

FIG. 7 is a flowchart of a process for setting a condition for a battery charging speed control shown in FIG. 4 according to a third embodiment of the present invention. Referring to FIG. 7, if a user starts and stops a charging of a battery on a specific day of the week, the specific day, a charging start time of the battery and a charging stop time of the battery are set as the condition for the charging speed control of the battery.

In particular, the controller 180 memorizes the battery charging start and stop times set by a user or performed on the specific day twice at least by saving them in the memory 160 (S231). In addition, the controller 180 sets the memorized specific day and the memorized battery charging start and stop times as the condition for the battery charging speed control (S232).

For instance, if a user starts the charging at 9:00 AM on Monday and stops the charging at 5:00 PM on Monday, the Monday, the charging start time '9:00 AM' and the charging stop time '5:00' PM are set as the condition. After the condition has been set by the step S231 and the step S232, if the battery charging starts, the controller 180 obtains a current day of the week on which the battery charging started and then determines whether the obtained current day matches the specific day included in the condition (S233).

As a result of the determination (S233), if the current day matches the specific day in the condition (S234), the controller 180 determines whether a current charging start time of the battery approaches or matches the charging start time included in the condition (S235). As a result of the determination (S235), if the charging start time of the battery approaches or matches the charging start time included in the condition (S236), the controller 180 determines the charging stop time included in the condition as the estimated charging stop time mentioned in the step S200 shown in FIG. 4 (S237).

Figure 8:
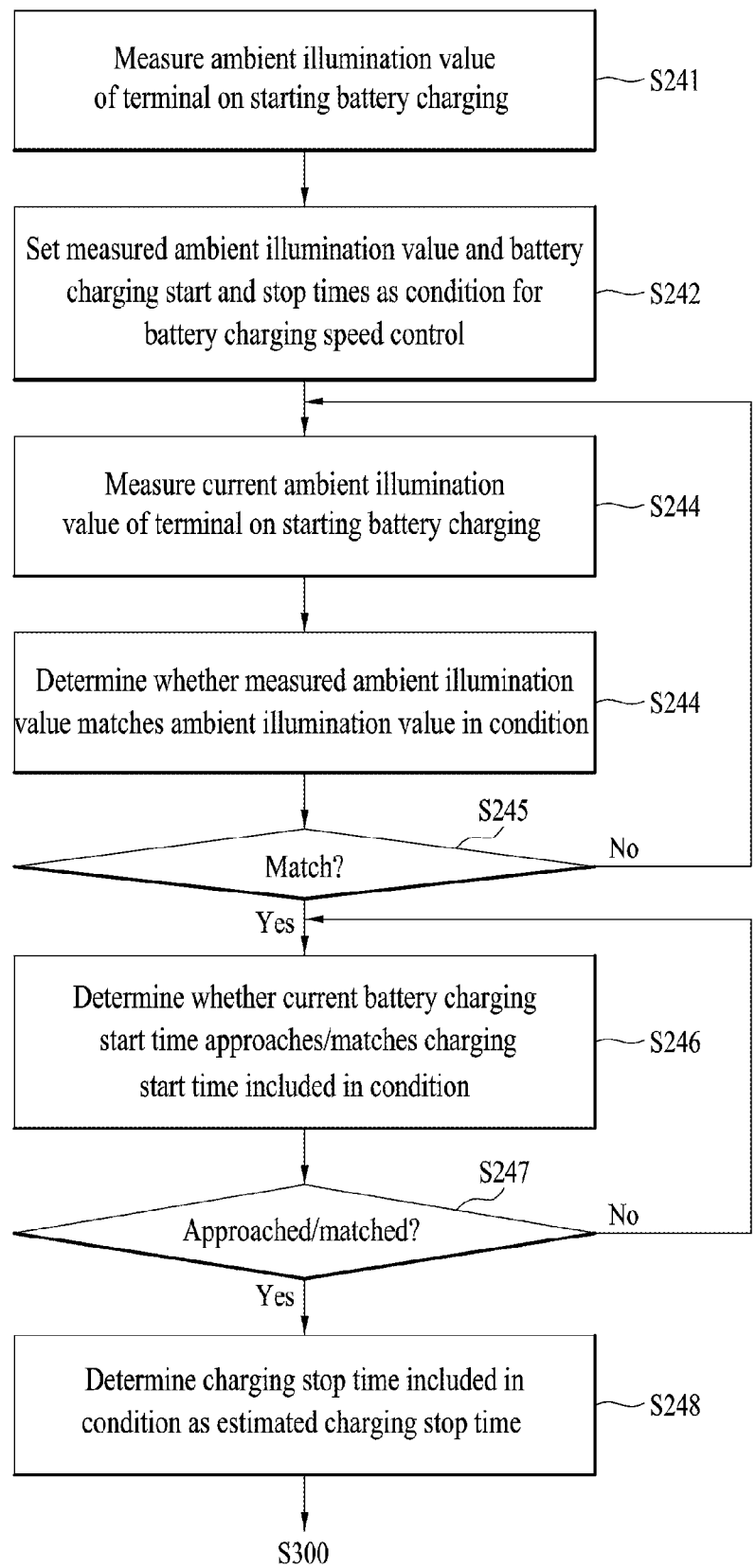
FIG. 8 is a flowchart of a process for setting a condition for a battery charging speed control shown in FIG. 4 according to a fourth embodiment of the present invention.

FIG. 8 is a flowchart of a process for setting a condition for a battery charging speed control shown in FIG. 4 according to a fourth embodiment of the present invention. Referring to FIG. 8, if a user starts and stops a charging of a battery in an environment having a user's ambience at a specific illumination, the specific illumination, a charging start time and a charging stop time are set as the condition for the charging speed control of the battery.

In particular, when the battery is charged, the controller 180 measures an ambient illumination of the mobile terminal 100 using the illumination sensor included in the sensing unit 140 (S241). If the charging of the battery is stopped, the controller 180 sets the measured ambient illumination and the battery charging start and stop times as the condition for the battery charging speed control (S242). For instance, when a user charges the battery in a dark room, an ambient illumination corresponding to the dark room, the charging start time of the battery and the charging stop time of the battery are set as the condition.

After the condition has been set by the step S241 and the step S242, if the battery charging starts, the controller 180 measures a current ambient illumination of the mobile terminal 100 using the illumination sensor (S243) and then determines whether the measured ambient illumination corresponds to the ambient illumination included in the condition (S244).

As a result of the determination (S244), if the measured ambient illumination corresponds to the ambient illumination included in the condition (S245), the controller 180 determines whether a current charging start time of the battery approaches or matches the charging start time included in the condition (S246). As a result of the determination (S246), if the charging start time of the battery approaches or matches the charging start time included in the condition (S247), the controller 180 determines the charging stop time included in the condition as the estimated charging stop time mentioned in the step S200 shown in FIG. 4 (S248).

Figure 9:
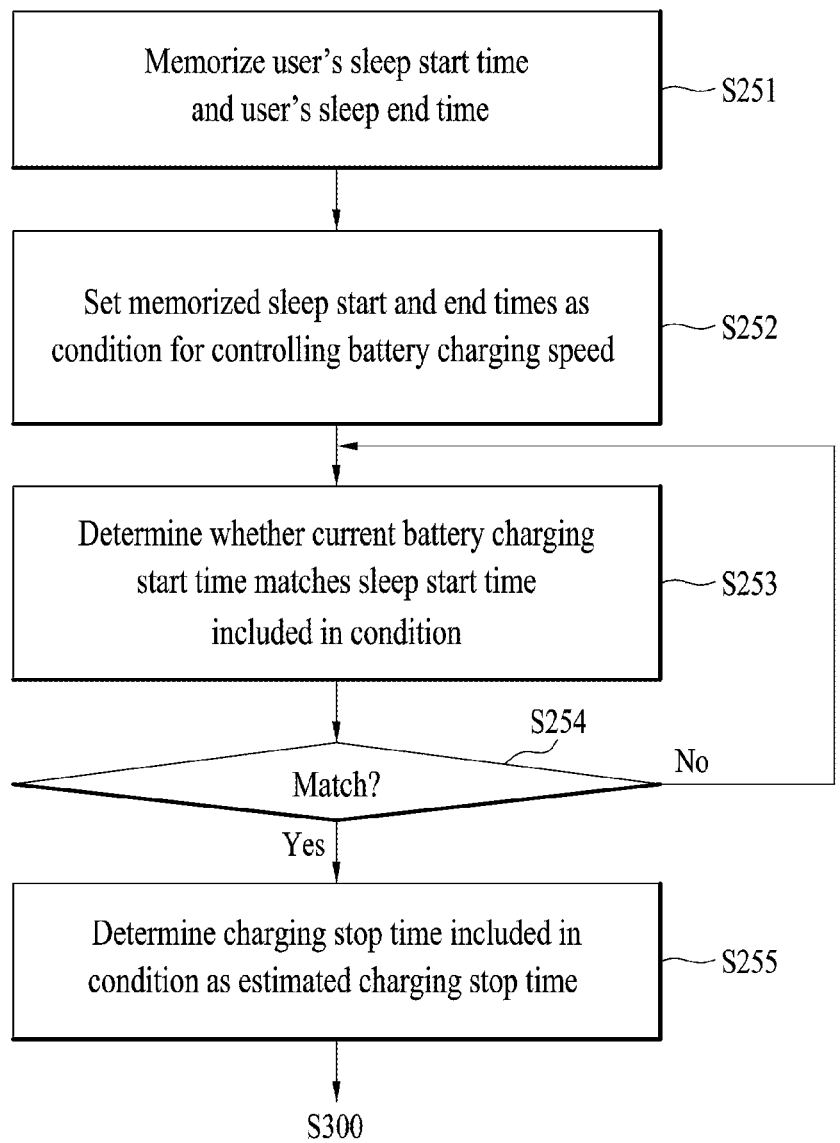
FIG. 9 is a flowchart of a process for setting a condition for a battery charging speed control shown in FIG. 4 according to a fifth embodiment of the present invention.

FIG. 9 is a flowchart of a process for setting a condition for a battery charging speed control shown in FIG. 4 according to a fifth embodiment of the present invention. Referring to FIG. 9, a user's sleep start time and a user's sleep end time are set as the condition for the charging speed control of the battery.

In particular, if a user sets a user's sleep start time and a user's sleep end time, the controller 180 saves the user's sleep start time and the user's sleep end time in the memory 160 (S251) and sets the saved user's sleep start time and the saved user's sleep end time as the condition for the battery charging speed control (S252).

For instance, if the user sets the user's sleep start time and the user's sleep end time to 12:00 PM and 7:00 AM, respectively, the 12:00 PM and the 7:00 AM are set as the condition. After the condition has been set by the step S251 and the step S252, if the battery charging starts, the controller 180 determines whether a charging start time of the battery approaches or matches the sleep start time included in the condition (S253).

As a result of the determination (S253), if the charging start time of the battery approaches or matches the sleep start time included in the condition (S254), the controller 180 determines the sleep end time included in the condition as the estimated charging stop time mentioned in the step S200 shown in FIG. 4 (S228).

Figure 10:
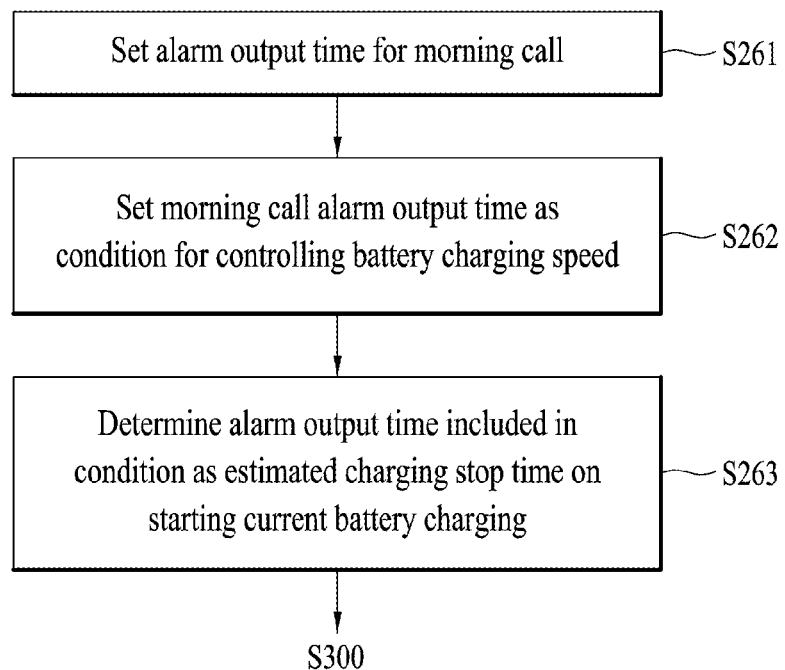
FIG. 10 is a flowchart of a process for setting a condition for a battery charging speed control shown in FIG. 4 according to a sixth embodiment of the present invention.

FIG. 10 is a flowchart of a process for setting a condition for a battery charging speed control shown in FIG. 4 according to a sixth embodiment of the present invention. Referring to FIG. 10, an alarm output time of a morning call set by a user is set as the condition for the charging speed control of the battery.

In particular, if a user sets a morning call and an alarm output time for notifying that a current time corresponds to the morning call set by the user (S261), the controller 180 sets the set alarm output time of the morning call as the condition for the battery charging speed control (S262). For instance, if the user sets the alarm output time of the morning call to 7:00 AM, respectively, the 7:00 AM is set as the condition.

After the condition has been set by the step S261 and the step S262, if the battery charging starts, the controller 180 determines the alarm output time of the morning call included in the condition as the estimated charging stop time mentioned in the step S200 shown in FIG. 4 (S263).

Figure 11:
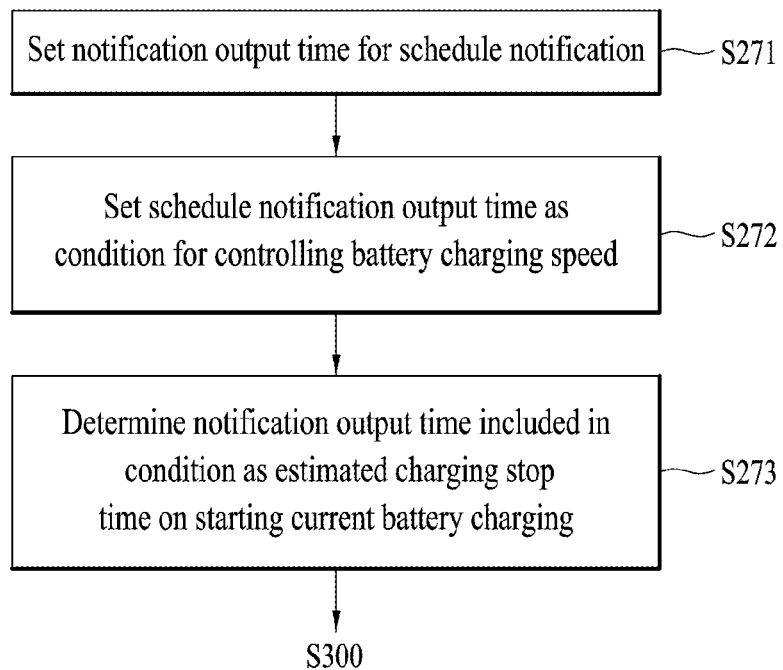
FIG. 11 is a flowchart of a process for setting a condition for a battery charging speed control shown in FIG. 4 according to a seventh embodiment of the present invention.

FIG. 11 is a flowchart of a process for setting a condition for a battery charging speed control shown in FIG. 4 according to a seventh embodiment of the present invention. Referring to FIG. 11, a notification output time of a schedule set by a user is set as the condition for the charging speed control of the battery.

In particular, if a user sets a schedule and a schedule notification output time for notifying that a current time corresponds to the schedule set by the user (S271), the controller 180 sets the set notification output time of the schedule as the condition for the battery charging speed control (S272). After the condition has been set by the step S271 and the step S272, if the battery charging starts, the controller 180 determines the alarm output time of the schedule call included in the condition as the estimated charging stop time mentioned in the step S200 shown in FIG. 4 (S273).

Figure 12:
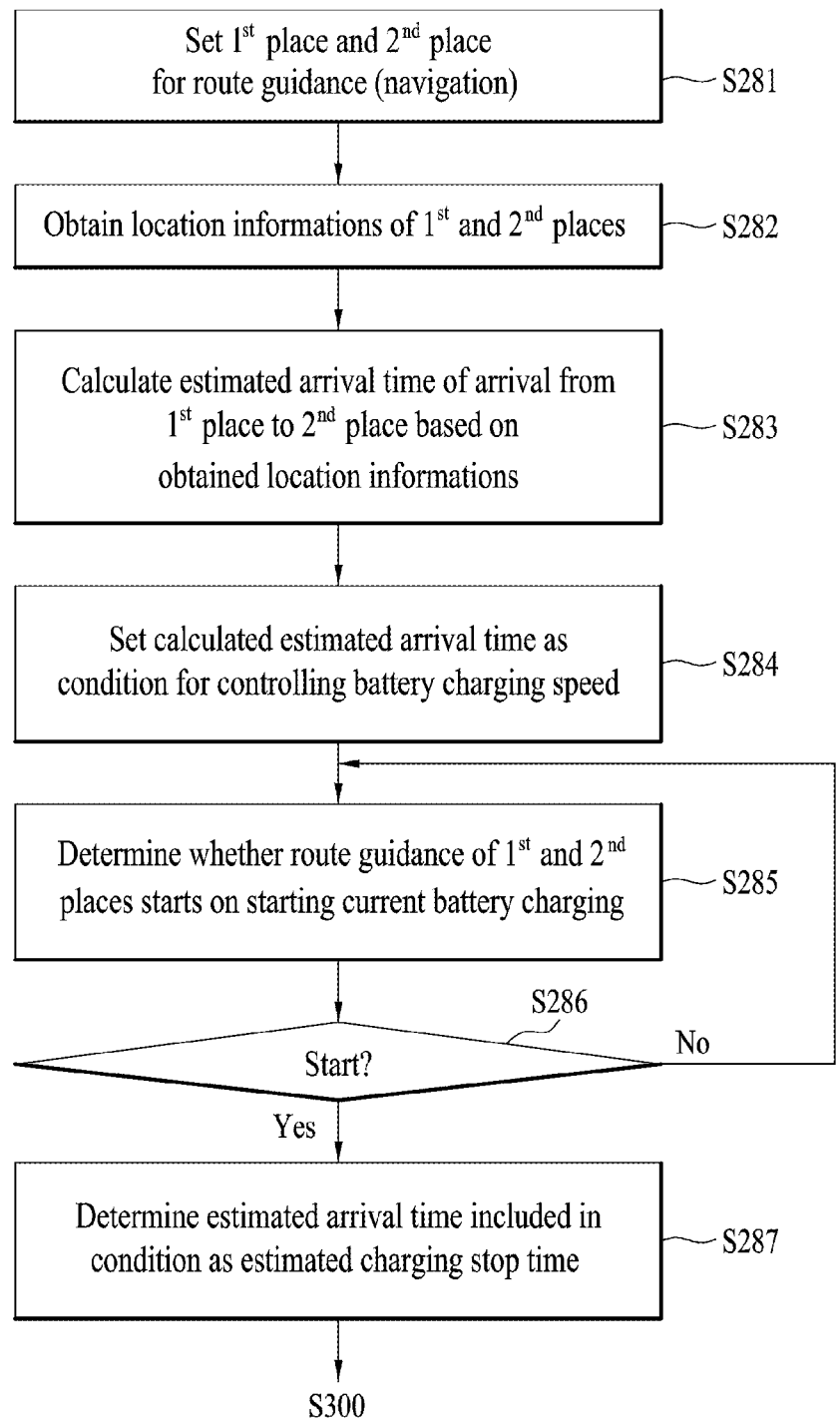
FIG. 12 is a flowchart of a process for setting a condition for a battery charging speed control shown in FIG. 4 according to an eighth embodiment of the present invention.

FIG. 12 is a flowchart of a process for setting a condition for a battery charging speed control shown in FIG. 4 according to an $8^{th}$ embodiment of the present invention. Referring to FIG. 12, after a user has started a charging of the battery at a current first place using a navigation function provided to the mobile terminal 100, if the user requests a guidance of a route from the first place to a second place (i.e., a desired destination), an estimated time of an arrival to the second place from the first place is calculated and then set as the condition for the battery speed control.

In particular, if the user sets the first place and the second place for the route guidance (S281), the controller 180 obtains location information of the first and second places (S282) and then calculates a moving path from the first place to the second place and an estimated arrival time based on the obtained location information of the first and second places (S283).

Thus, the location information of the first place corresponding to a current place can be obtained through the position location module 115. In addition, the location information of the second place corresponding to the destination can be obtained through a map application installed on the mobile terminal 100.

The controller 180 sets the location information of the first and second places and the calculated estimated arrival time as the condition for the battery charging speed control (S284). For instance, if the first place corresponding to the current place is a home, the second place corresponding to a destination is an office, and an estimated arrival time from the home to the office is 1 hour, a location information of the home, a location information of the office and the 1 hour corresponding to the estimated arrival time are set as the condition.

After the condition has been set by the steps S281 to S284, if the charging of the battery starts, the controller 180 determines whether the route guidance to the second place from the first place is started in response to a user's request (S285). In particular, after the battery charging has started, if a current location obtained through the position location module 115 corresponds to the first place included in the condition and a route guidance function (e.g., a navigation function) from the first place to the second place is activated through a navigation application installed on the mobile terminal 100, the controller 180 determines that the route guidance from the first place to the second place is started.

As a result of the determination (S285), if the route guidance from the first place to the second place is determined as started (S286), the estimated arrival time included in the condition is determined as the estimated charging stop time mentioned in the step S200 shown in FIG. 4 (S287).

So far, the step S200 shown in FIG. 4 is described in detail with reference to FIGS. 5 to 12. In the following description, the step S300 shown in FIG. 4 shall be explained in detail with reference to FIG. 13. In particular, FIG. 13 is a flowchart of a process for controlling a battery charging speed according to an embodiment of the present invention.

Figure 13:
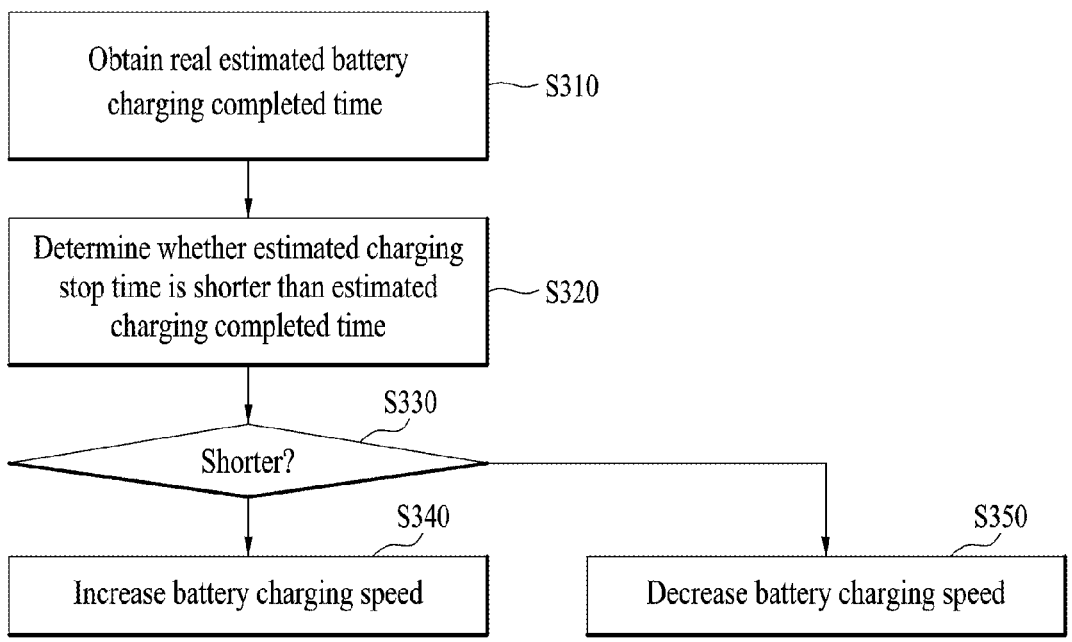
FIG. 13 is a flowchart of a process for controlling a battery charging speed according to an embodiment of the present invention.

Referring to FIG. 13, if the battery starts to be charged, the controller 180 obtains an estimated charging completed time of the battery using a capacity of the battery and a charging power supplied to the battery (S310). With reference to a charging start time of the battery, the controller 180 increases or decreases a charging speed of the battery depending on a time difference between the estimated charging stop time of the battery determined by one of the processes described with reference to FIGS. 5 to 12 and the obtained estimated charging completed time.

In particular, the controller 180 determines whether the estimated charging stop time is shorter than the estimated charging completed time (S320). As a result of the determination, if the estimated charging stop time is shorter than the estimated charging completed time (S330), the controller 180 controls the battery charging speed to increase in order for the battery charging to be completed in the estimated charging stop time (S340).

For instance, if the estimated charging completed time is set for 3 hours from a current time but the estimated charging stop time is set for 2 hours from the current time, the controller 180 controls the battery charging speed to be increased higher than a previous charging speed in order to complete the battery charging in 2 hours. On the contrary, as a result of the determination, if the estimated charging stop time is not shorter than the estimated charging completed time, the controller 180 controls the battery charging speed to decrease in order to complete the battery charging in the estimated charging stop time (S350).

For instance, if the estimated charging completed time is set for 3 hours from a current time but the estimated charging stop time is set for 4 hours from the current time, the controller 180 controls the battery charging speed to be decreased lower than a previous charging speed in order to complete the battery charging in 4 hours, thereby extending a life of the battery. Meanwhile, in the course of controlling the charging speed of the battery by one of the processes described with reference to FIGS. 4 to 13, the controller 180 performs a forced compensation charging on the battery in order for the battery to be fully charged right before a current time becomes the estimated charging stop time.

Figure 14:
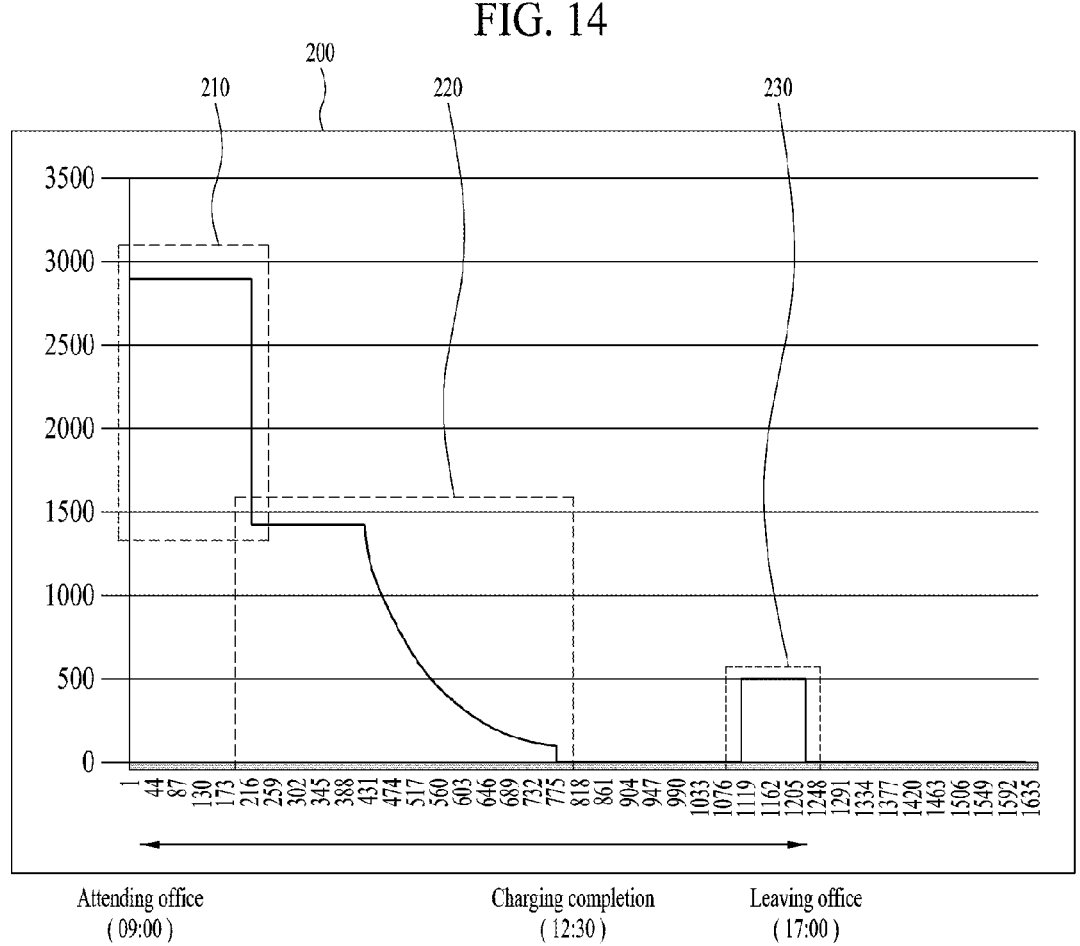
FIGS. 14 to 19 are diagrams to describe a process for controlling a battery charging speed in a mobile terminal according to one embodiment of the present invention.

FIGS. 14 to 19 are diagrams to describe a process for controlling a battery charging speed in a mobile terminal according to one embodiment of the present invention. For instance, as mentioned in the foregoing description with reference to FIG. 5, FIG. 14 is a graph 200 indicating a charged status of a battery if a user starts and stops a charging in a specific time slot.

Referring to FIG. 14, a user attends their office at 9:00 AM and then leaves the office at 17:00 PM. A charging start time of the battery is 9:00 AM and an estimated charging stop time of the battery is 17:00 PM. In this instance, the controller 180 charges the battery by increasing a charging speed in a first interval 210 by which a life of the battery is not affected.

If an estimated charging completed time of the battery from the charging start time of the battery is shorter than the estimated battery stop time (e.g., 17:00 PM) of the battery, since a time for charging the battery is secured sufficiently, the controller 180 decreases the charging speed of the battery in a second interval 220 to save the life of the battery. In addition, the controller 180 performs a forced compensation charging 230 at a rate of 1%~9% right before the current time becomes the estimated charging stop time of the battery.

Figure 15:
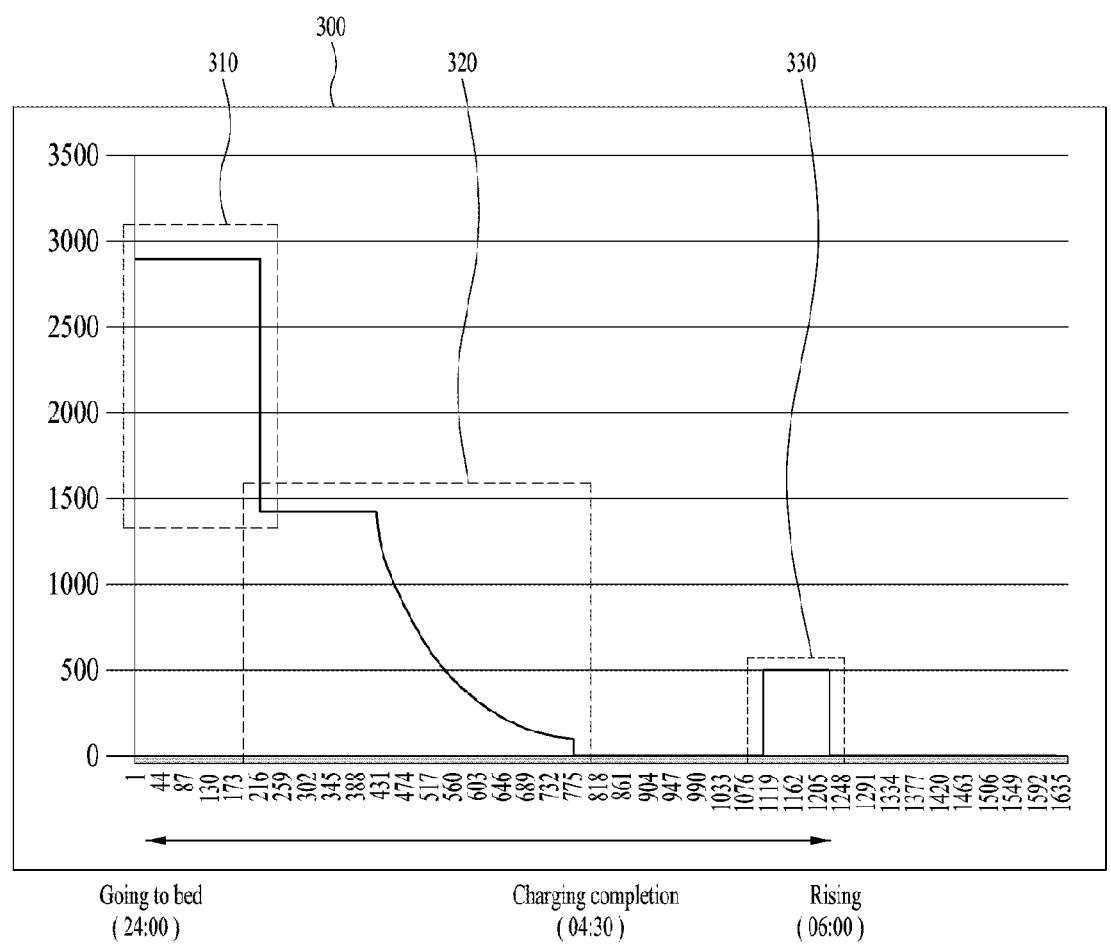

In another instance, as mentioned in the foregoing description of the morning call with reference to FIG. 10, FIG. 15 is a graph 300 indicating a charged status of a battery if a user starts a charging of the battery at a bedtime and then stops the charging at a rising time.

Referring to FIG. 15, if a user sets an alarm output time of a morning call to 6:00 AM and then goes to bed at 24:00, a charging start time of the battery is 24:00 and an estimated charging stop time of the battery is 6:00 AM. In this instance, the controller 180 charges the battery by increasing a charging speed in a first interval 310 by which a life of the battery is not affected.

If an estimated charging completed time of the battery from the charging start time of the battery is shorter than the estimated battery stop time (e.g., 6:00 AM) of the battery, since a time for charging the battery is secured sufficiently, the controller 180 decreases the charging speed of the battery like a second interval 320 to save the life of the battery. In addition, the controller 180 performs a forced compensation charging 330 at a rate of 1%~9% right before the current time becomes the estimated charging stop time of the battery (i.e., the user's rising time).

Figure 16:
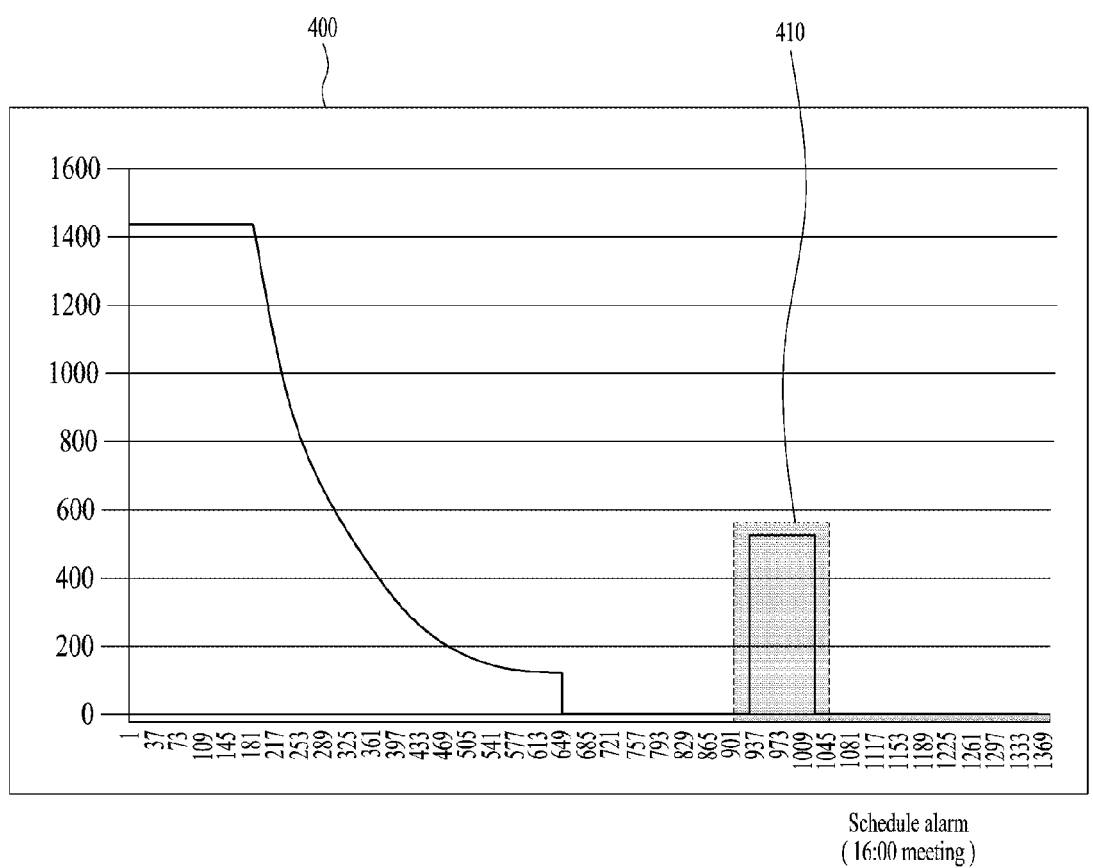

In another instance, as mentioned in the foregoing description of the schedule with reference to FIG. 11, FIG. 16 is a graph 400 indicating a charged status of a battery if a user starts a charging of the battery and then stops the charging at a schedule notification output time.

Referring to FIG. 16, if a user sets a schedule notification output time to 16:00 PM and then starts a charging of the battery before 16:00 PM, an estimated charging stop time of the battery is 16:00 PM. In this instance, the controller 180 controls a charging speed of the battery depending on a time difference between an estimated charging completed time of the battery and an estimated charging stop time. In addition, the controller 180 performs a forced compensation charging 410 at a rate of 1%~9% right before the current time becomes the estimated charging stop time of the battery (i.e., the user's schedule notification output time).

Figure 17:
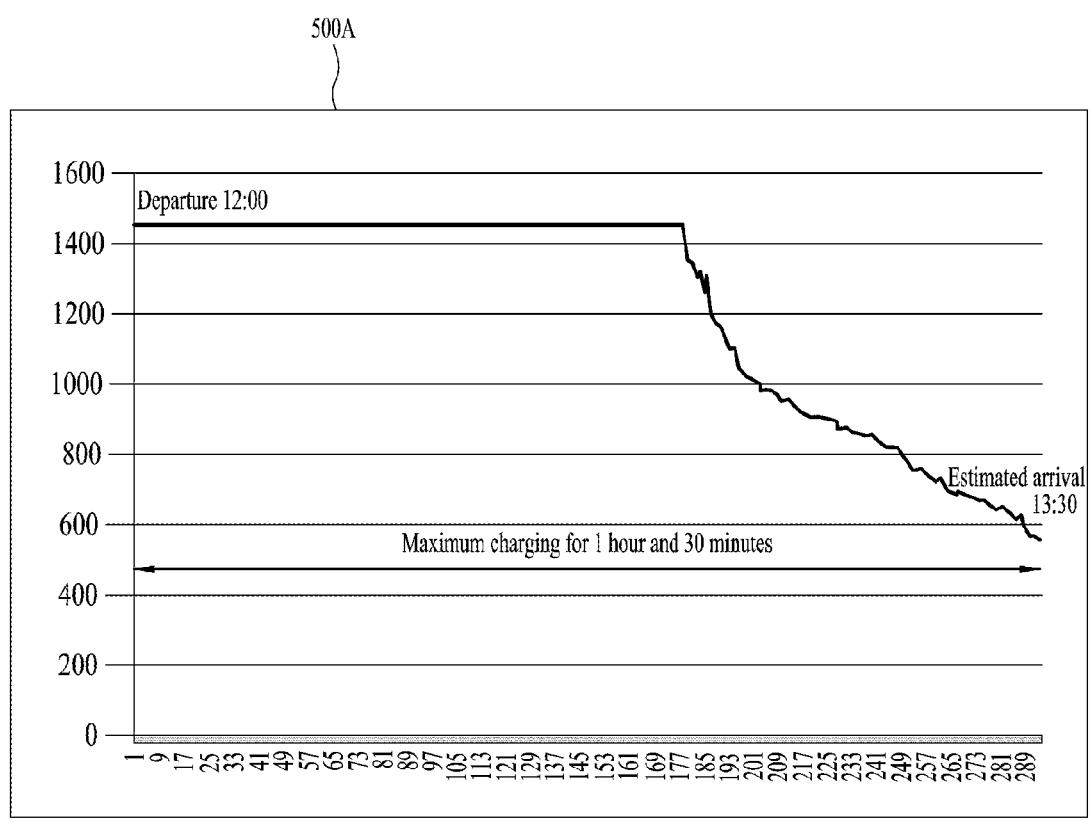
Figure 18:
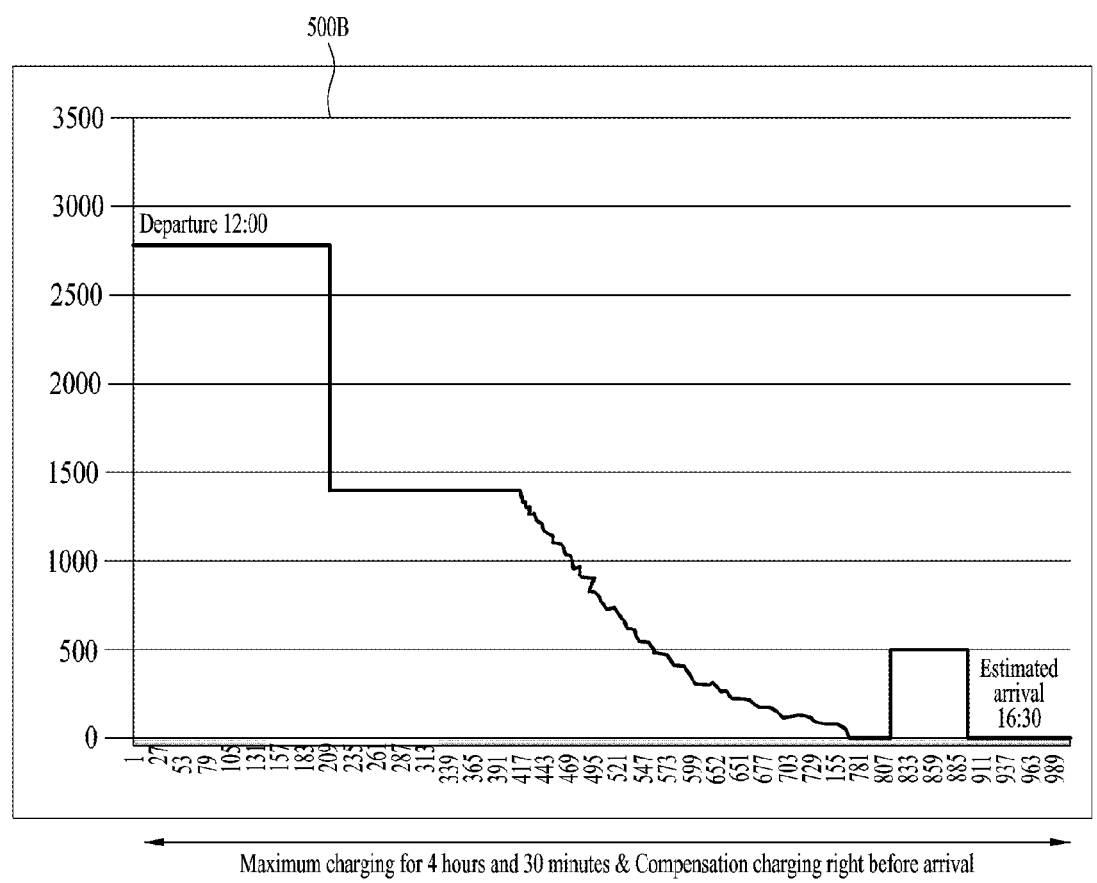

In addition, similar to the route guidance described with reference to FIG. 12, FIG. 17 and FIG. 18 are graphs 500A and 500B indicating a charged status of a battery in the course of charging the battery while a user moves to a second place from a first place.

Referring to FIG. 17, a user starts to charge the battery at 12:00 PM at the first place. An estimated arrival time of an arrival from the first place to the second place (i.e., a destination) is 13:30 PM, which means that it will take 1 hour and 30 minutes to arrive at the second place. If an estimated charging completed time of the battery is 2 hours and 30 minutes, the controller 180 increases a charging speed of the battery in order for the battery to be charged for the 1 hour and 30 minutes as fully as possible.

Referring to FIG. 18, a user starts to charge the battery at 12:00 PM at the first place. An estimated arrival time of an arrival from the first place to the second place (i.e., a destination) is 16:30 PM, which means that it will take 4 hour and 30 minutes to arrive at the second place. If an estimated charging completed time of the battery is 2 hours and 30 minutes, since a charging time of the battery is secured sufficiently, the controller 180 decreases a charging speed of the battery to save a life of the battery and then performs a forced compensation charging right before a current hour becomes the estimated charging stop time of the battery (i.e., 16:30 PM).

Figure 19:
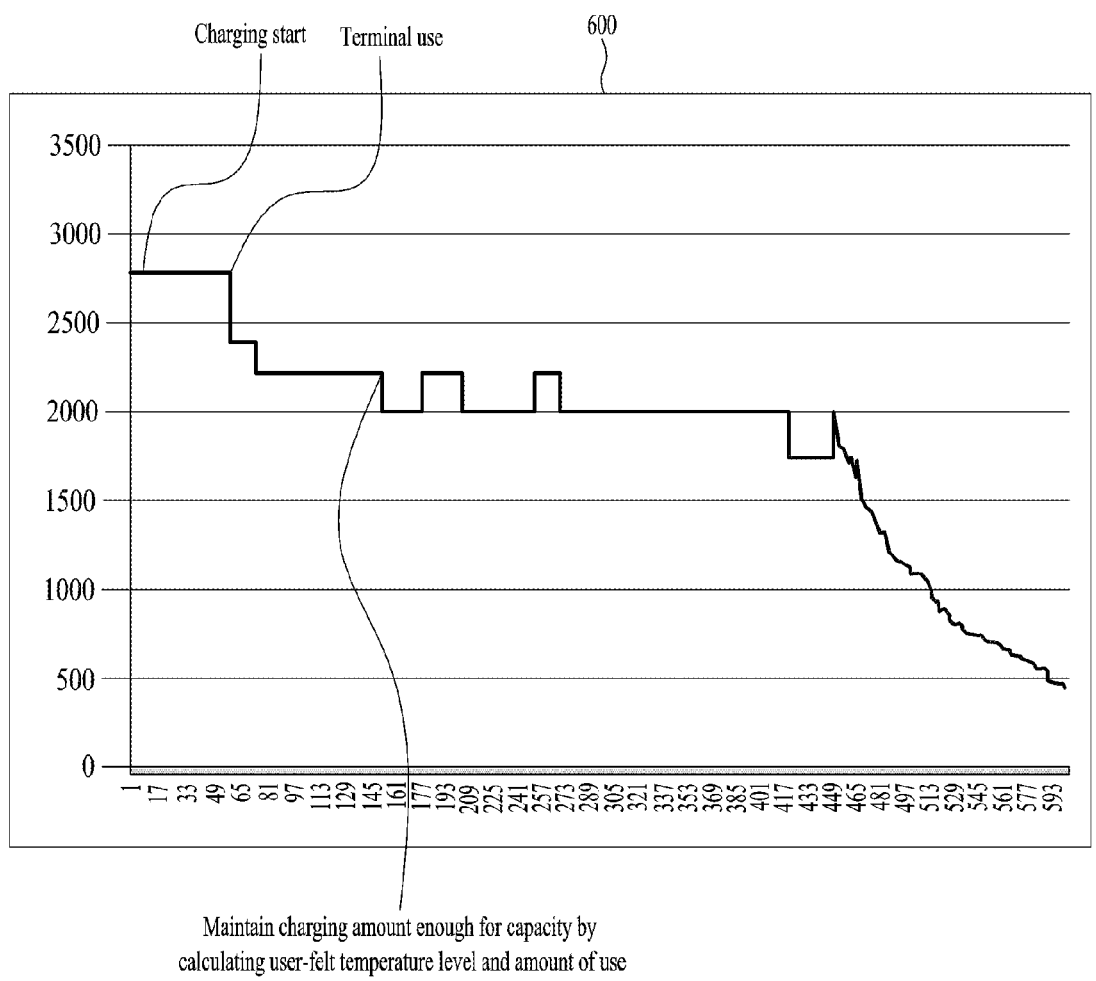

Finally, FIG. 19 is a graph 600 of a charged status of a battery when a user uses the mobile terminal 100 in the course of charging the battery. Referring to FIG. 19, after the battery has started to be charged, if an amount of power consumption of the battery is greater than a charging amount currently supplied to the battery due to the user's use of the mobile terminal 100, the controller 180 increases a charging speed of the battery by calculating a temperature of the battery and a used amount of the battery so that the charging amount supplied to the battery exceeds the amount of the power consumption of the battery.

If a charged amount of the battery is greater than the power consumption amount of the battery in a predetermined interval, the controller decreases the charging speed of the battery for the sake of a life and temperature drop of the battery.

Accordingly, embodiments of the present invention provide various effects and/or features. First of all, when a battery is charged, an estimated charging stop time on which the battery charging will be stopped by a user in consideration of a user's living pattern is obtained. Subsequently, a charging speed of the battery is adjusted in order to complete the battery charging before a current time becomes the obtained estimated charging stop time. Therefore, the present invention substantially provides an effect such that the user can fully charge the battery in a period for charging the battery.

Secondly, the present invention adjusts a charging speed of the battery until the estimated charging stop time, thereby enhancing durability of the battery.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet). Further, the processor may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal, comprising:
a battery;
a memory configured to store at least one condition for controlling a charging speed of the battery in charging the battery; and
a controller configured to:
when a charging of the battery starts, estimate a charging stop time at which the battery will stop being charged by a user based on the condition, and
control the charging speed of the battery to complete the charging of the battery before a charging start time of the battery reaches the estimated charging stop time,
wherein the controller is further configured to:
when the charging of the battery starts, estimate a battery charging completed time, and
control the charging speed of the battery according to a difference between the estimated battery charging stop time and the estimated battery charging completed time with reference to the battery charging start time.

2. The mobile terminal of claim 1, wherein condition includes a charging start time and a charging stop time of the battery for the battery charging performed in a same time twice at least and
wherein when the charging start time of the battery is associated with the charging start time included in the condition, the controller recognizes the charging stop time included in the condition as the estimated charging stop time.

3. The mobile terminal of claim 1, wherein when the charging start time of the battery approaches or matches the charging start time included in the condition, the controller recognizes the charging stop time included in the condition as the estimated charging stop time.

4. The mobile terminal of claim 1, further comprising:
a position location unit configured to obtain a current location of the mobile terminal,
wherein the condition includes a charging start time of the battery and a charging stop time of the battery for the battery charging performed at a preset specific location,
wherein when the charging of the battery starts, the controller obtains the current location of the mobile terminal via the position location unit, and wherein when the obtained current location corresponds to the specific location included in the condition and the charging start time of the battery is associated with the charging start time included in the condition, the controller recognizes the charging stop time included in the condition as the estimated charging stop time.

5. The mobile terminal of claim 1, wherein the condition includes a charging start time of the battery and a charging stop time of the battery for the battery charging performed on a preset specific day, and wherein when a day of starting the charging of the battery matches the specific day included in the condition and the charging start time of the battery is associated with the charging start time included in the condition, the controller recognizes the charging stop time included in the condition as the estimated charging stop time.

6. The mobile terminal of claim 1, further comprising:
an illumination sensor configured to measure an ambient illumination of the mobile terminal,
wherein the condition includes a charging start time of the battery and a charging stop time of the battery for the battery charging performed at a preset illumination,
wherein when the charging of the battery starts, the controller obtains the ambient illumination of the mobile terminal via the illumination sensor, and
wherein when the obtained ambient illumination corresponds to the illumination included in the condition and the charging start time of the battery is associated with the charging start time included in the condition, the controller recognizes the charging stop time included in the condition as the estimated charging stop time.

7. The mobile terminal of claim 1, wherein the condition includes a preset user's sleep start time and a preset user's sleep end time and wherein when the charging start time of the battery is associated with the sleep start time, the controller recognizes the charging stop time included in the condition as the estimated charging stop time.

8. The mobile terminal of claim 1, wherein the condition includes an alarm output time for a preset morning call and wherein when the charging of the battery starts, the controller recognizes the alarm output time as the estimated charging stop time.

9. The mobile terminal of claim 1, wherein the condition includes an alarm output time of a preset schedule and wherein when the charging of the battery starts, the controller recognizes the alarm output time as the estimated charging stop time.

10. The mobile terminal of claim 1, wherein the condition includes an estimated arrival time of an arrival to a second location from a first location and wherein when the charging of the battery starts, the controller recognizes the estimated arrival time as the estimated charging stop time.

11. The mobile terminal of claim 10, further comprising:
a position location unit configured to obtain a current location of the mobile terminal,
wherein when the charging of the battery starts, the controller obtains a location at which the charging of the battery starts through the position location unit, and
wherein when the obtained location corresponds to the first location, the controller recognizes the estimated arrival time included in the condition as the estimated charging stop time.

12. The mobile terminal of claim 1, wherein when the estimated charging stop time is longer than the estimated charging completed time, the controller decreases the charging speed of the battery in order for the battery to be fully charged for the estimated charging stop time.

13. The mobile terminal of claim 1, wherein when the estimated charging stop time is shorter than the estimated charging completed time, the controller increases the charging speed of the battery in order for the battery to be fully charged for the estimated charging stop time.

14. The mobile terminal of claim 1, wherein the controller performs a forced compensation charging on the battery in order for the battery to be fully charged right before the current time reaches the estimated charging stop time.

15. A method of controlling a mobile terminal, the method comprising:
estimating, via a controller of the mobile terminal, a charging stop time at which a battery of the mobile terminal will stop being charged by a user based on at least one condition preset for controlling a charging speed of the battery when a charging of the battery starts;
controlling, via the controller, the charging speed of the battery to complete the charging of the battery before a charging start time of the battery reaches the estimated charging stop time;
estimating, via the controller, a battery charging completed time when the charging of the battery starts; and
controlling, via the controller, the charging speed of the battery according to a difference between the estimated battery charging stop time and the estimated battery charging completed time with reference to the battery charging start time.

16. The method of claim 15, further comprising the step of when the charging of the battery starts, estimating a charging completed time of the battery, wherein the controlling step comprises the step of controlling the charging speed of the battery depending on a difference between the estimated charging stop time and the estimated charging completed time with reference to the charging start time of the battery.

17. The method of claim 16, the controlling step comprising the step of wherein when the estimated charging stop time is longer than the estimated charging completed.

18. The method of claim 16, the controlling step comprising the step of when the estimated charging stop time is shorter than the estimated charging completed time, increasing the charging speed of the battery in order for the battery to be fully charged for the estimated charging stop time.

19. The method of claim 15, further comprising the step of performing a forced compensation charging on the battery in order for the battery to be fully charged right before the current time reaches the estimated charging stop time.

* * * * *